United States Patent [19]

Buckner

[11] E Re. 30,532

[45] Reissued Mar. 3, 1981

[54] FLAPPER VALVE WITH INDEPENDENT SPRING ACTION

[75] Inventor: Spencer P. Buckner, Houston, Tex.

[73] Assignee: TRW Inc., Cleveland, Ohio

[21] Appl. No.: 964,943

[22] Filed: Nov. 30, 1978

Related U.S. Patent Documents

Reissue of:

[64] Patent No.: 4,005,732
Issued: Feb. 1, 1977
Appl. No.: 607,339
Filed: Aug. 25, 1975

[51] Int. Cl.[3] ..... F16K 15/03

[52] U.S. Cl. ..... 137/512.1

[58] Field of Search ..... 137/512, 512.1, 512.15, 137/521, 527; 98/41 R, 106, 107, 110–113

[56] References Cited

U.S. PATENT DOCUMENTS

| | | | |
|---|---|---|---|
| 303,702 | 8/1884 | Carricaburu | 137/512 X |
| 3,127,148 | 3/1964 | Collar | 137/527 X |
| 3,718,156 | 2/1973 | Fujii | 137/512.1 |
| 3,910,114 | 10/1975 | Rosaen | 73/228 |

FOREIGN PATENT DOCUMENTS

| | | | |
|---|---|---|---|
| 948235 | 1/1964 | United Kingdom | 137/512.1 |

*Primary Examiner*—Robert G. Nilson
*Attorney, Agent, or Firm*—Daniel G. Blackhurst

[57] ABSTRACT

An improvement in multi-flapper check valves wherein each flapper is urged toward closure by an independent spring or springs, thereby improving the valve response for closure.

3 Claims, 4 Drawing Figures

FLAPPER VALVE WITH INDEPENDENT SPRING ACTION

Matter enclosed in heavy brackets [ ] appears in the original patent but forms no part of this reissue specification; matter printed in italics indicates the additions made by reissue.

BACKGROUND OF THE INVENTION

This invention relates to a new and useful improvement in multi-flapper check valves.

In flapper valves of the design disclosed in Bravo, U.S. Pat. No. 1,238,878 (1917), and improved upon by Wheeler in U.S. Pat. Nos. 3,007,488 (1961), 3,026,901 (1962), 3,072,141 (1963), and 3,074,427 (1963), the two flappers are urged toward their seated positions by one or more helical springs wound about a shaft, with the two ends of each spring contacting the two valve flappers respectively. Thus, both flappers are urged toward their seated position by the same spring; or, in the case of multiple spring use, each spring acts upon both flapper elements.

Because of the disparity between the frictional resistances of the two flappers of the check valve of the Wheeler design, and other differences in the forces acting on them, there is a tendency for one of the flappers to close more readily and therefore seat before the other. When one flapper has seated, and the other flapper has almost seated, the energy of a spring acting upon both flappers has been largely dissipated and the torque the spring exerts against the partially open flapper is relatively low. This can cause the flapper to hesitate before closing, resulting in possible pressure surges and hammer.

In Smith, U.S. Pat. No. 3,384,112 (1968), the inventor interconnected the flappers by a relatively complex gearing arrangement to promote synchronous flapper closure. The present invention involves a much less complicated adaptation of the basic valve structure to improve performance. Additionally, the present invention, by proper choice of relative spring strengths, allows for a design in which the flappers close synchronously, or one flapper closes before the other.

For improved valve response, it is desirable to increase the spring torque exerted against each flapper element as the flappers closely approach their seat. Accordingly, it is an object of the present invention to provide a multi-flapper check valve with improved valve response.

Another object of this invention is to provide a multi-flapper check valve wherein total angular spring deflection is reduced.

A further object of this invention is to provide a multi-flapper check valve wherein higher torque springs may be used to increase the torque acting upon a flapper when the flapper is near its seated position.

Yet a further object of this invention is to provide a multi-flapper check valve wherein each flapper is biased by a separate spring.

Other objects and purposes of this invention will appear from the following descriptions, examples, and claims.

SUMMARY OF THE INVENTION

In this novel improvement in multi-flapper check valves, each flapper is biased by one or more springs not acting on any other flapper. Instead of each of the two legs of the spring acting upon a separate flapper, as is presently commonly done, only one of the legs of each spring acts upon a flapper, and the other leg of the spring is held by a "stop post". Thus, each spring undergoes less total angular deflection as the flappers move from the closed position to the open position. Stiffer springs may be used since less deflection occurs, with the result that greater torque can be exerted by the spring against the flapper for small angular deflections of the flapper about its nearly closed position.

DESCRIPTION OF THE PREFERRED EMBODIMENTS

Figure 1:
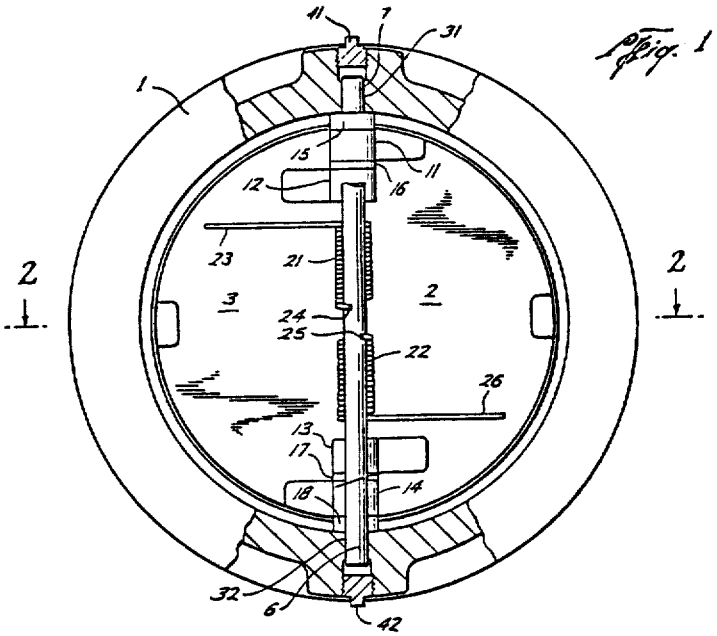
FIG. 1 shows the check valve assembly viewed from the downstream side.
Figure 2:
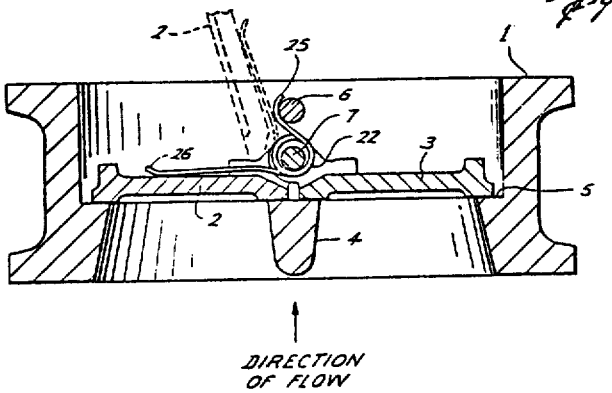
FIG. 2 is an axial section of the check valve assembly taken along line 2—2 of FIG. 1.

The basic elements of this novel check valve are shown in FIGS. 1 and 2. A semicircular right flapper 2 and a semicircular left flapper 3 lie on the body 1 with their straight edges lying along center rib 4 of the body 1. The hinge pin 7 is inserted through the hinge pin holes 31 in the body 1, running through the upper body lug bearing 15, upper right hinge lug 11, upper plate lug bearing 16, upper left hinge lug 12, independent spring 21, independent spring 22, lower right hinge lug 13, lower plate lug bearing 17, lower left hinge lug 14, and lower body lug bearing 18. Two hinge pin retainers 41 inserted into hinge pin holes 31 hold the hinge pin 7 in place. The stop pin 6 is inserted through stop pin holes 32 in the body 1, running through the hooked leg 24 of spring 21 and the hooked leg 25 of spring 22. Two stop pin retainers 42 inserted into stop pin holes 32 hold the stop pin 6 in place.

Ordinarily, the installed check valve is oriented with the rib 4 in a vertical position.

While the specific embodiment shown only uses one spring for each flapper, it is expressly understood that more than one spring may be used for each flapper. Moreover, while only helical torsion springs are shown, it is expressly understood that any torsion spring or torque producing means may be substituted. Since this novel design permits the use of shorter, stiffer (higher torque) springs, the ability to use multiple springs is enhanced.

Figure 3:
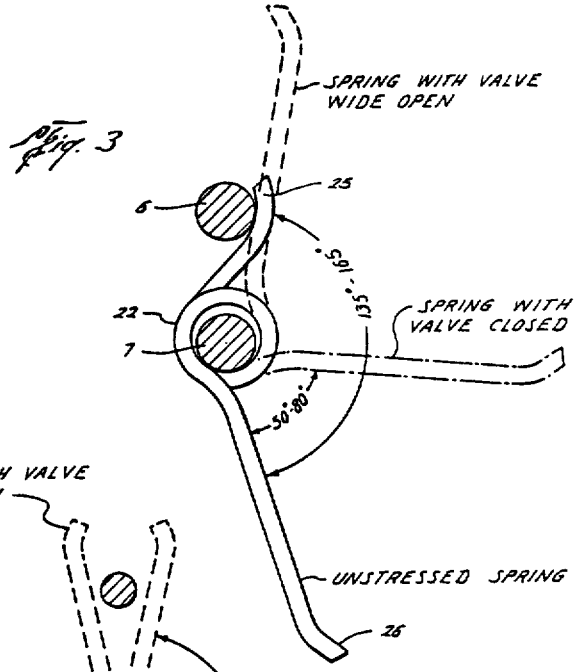
FIG. 3 illustrates the angular deflection of the torsion spring as used in this novel improvement.
Figure 4:
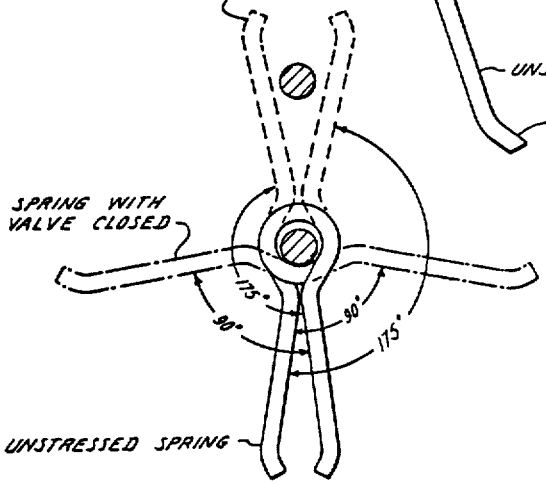
Fig. 4 PRIOR ART
FIG. 4 illustrates the angular deflection of the torsion spring as used in the prior art.

As is shown in the comparison of FIGS. 3 and 4, the total angular deflection of the independent spring used in this novel design is considerably less than that of a non-independent spring. Referring to FIG. 4, the conventional spring is "preloaded" such that usually it is bent approximately 180° (90° for each end) from its unstressed position when the flappers are closed. This biases the flappers toward the closed position even when nearly closed or even seated. When both flappers are fully open, the spring has been deflected approximately an additional 170°, for a total angular deflection of approximately 350° (175° for each end of the spring).

In this new design, the springs may each be preloaded about 50° to 80° or less from their unstressed positions, as is shown in FIG. 3. This reduced angular preloading of each spring is made possible because: (1) each spring acts upon only one flapper, and need be preloaded less than a single spring acting on both flappers; and (2) the use of stiffer springs reduces the required angular deflection for a specific amount of torque to be preloaded. When a flapper is in its fully open position, its spring is deflected approximately an additional 85°, for a total angular deflection of about 135° to 165°, as compared with the 350° angular deflection of the spring in a conventional design.

A further advantage of the novel independent spring design is that the characteristics of each spring may be tailored to compensate for any non-uniform or assymetrical response of the flappers. As discussed earlier, the two flappers may require different amounts of force to close because of inequalities in frictional forces or other forces acting upon them. Quite typically, one of the flappers will be more difficult to close because of additional frictional resistance acting upon it. In a conventionally designed check valve, this results in the other flapper closing first, and the practically exhausted spring then acting upon only the nearly closed flapper. This hesitation in complete valve closure can result in allowing the flow through the check valve to reverse before the slower flapper has seated, thereby causing the flapper to slam shut with a resulting pressure surge. However, when independent springs are used, a higher torque spring may be used to act upon the flapper having more frictional resistance, thereby providing that flapper with additional closing force and higher torque acting upon it when nearly closed. By proper design of the relative strengths of the springs, the valve can be made wherein the flappers close synchoronously, or one flapper closes slightly before the other.

Also, since each independent spring undergoes less total angular deflection, the springs may typically be shorter than those of the conventional design, thereby allowing more springs to be used. The use of multiple independent springs for each flapper may be desirable, for in a valve of such design one or more springs would continue to provide biasing torque to the flapper should one of the springs acting on that flapper fail.

The use of stiffer or higher torque springs acting on the flappers increases the angular acceleration of the flapper toward the seat. The greater the angular acceleration, the faster the valve response. If the movement of the flapper plates matches the deceleration of the fluid flow through the check valve, pressure surges and "hammer" can be minimized. However, if insufficient torque acts on the flapper plate, the valve will still be partially opened when the rate of flow has gone to zero and the direction of flow starts to reverse. Some backflow will then occur, resulting in a pressure surge and hammer when the valve finally closes. Since stiffer springs may be used in this novel design because of the reduced total angular deflection of the spring between the open and closed positions, more torque can be exerted by the spring against the flapper plate. The increased torque acting upon each flapper enables the flapper to close more quickly and will improve valve performance.

I claim:

1. An improved valve of the type having a body with a fluid flow conduit therethrough, a valve seat surrounding said flow conduit, valve members for sealing said fluid flow conduit, stationary shaft means extending diametrically across said flow conduit for pivotally supporting said valve members within said body, and hinges for supporting said valve members on said shaft means, wherein the improvement comprises at least one separate helical torsion spring encircling a portion of said shaft means for each valve member for biasing said valve member toward its closed position, one leg of which is in contact with said valve member and the other leg of which is in contact with a stationary stop means, *said stop means comprising a pin member extending diametrically across said flow conduit parallel to said shaft means at a location spaced from said valve members to limit movement of said valve members in an opening direction.*

2. The improved valve of claim 1 in which at least two of said helical torsion springs have different torsional spring constants.

[3. An improved valve of the type having a body with a fluid flow conduit therethrough, a valve seat surrounding said flow conduit, valve members for sealing said fluid flow conduit, a shaft for pivotally supporting said valve members within said body, and hinges for supporting said valve members on said shaft, wherein the improvement comprises at least one separate helical torsion spring wound about said shaft for each valve member, one leg of said spring being in contact with said valve member and the other leg being in contact with a stationary stop shaft.]

[4. The improved valve of claim 3 in which at least two of said helical torsion springs exert different amounts of force per degree of deflection.]

5. An improved valve of the type having a body with a fluid flow conduit therethrough, a valve seat surrounding said flow conduit, valve members for sealing said flow conduit, a single stationary shaft extending diametrically across said flow conduit for pivotally supporting said valve members within said body, and hinges for supporting said valve members on said stationary shaft, wherein the improvement comprises at least one separate helical torsion spring encircling a portion of said stationary shaft for each valve member for biasing said valve member toward its closed position, one leg of which is in contact with said valve member and the other leg of which is in contact with a stationary stop means, *said stop means comprising a pin member extending diametrically across said flow conduit parallel to said stationary shaft at a location spaced from said valve members to limit movement of said valve members in an opening direction.*

[6. An improved valve of the type having a body with a fluid flow conduit therethrough, a valve seat surrounding said flow conduit, valve members for sealing said fluid flow conduit, a first single stationary shaft extending diametrically across said flow conduit for pivotally supporting said valve members within said body, and hinges for supporting said valve members on said first stationary shaft, wherein the improvement comprises at least one separate helical torsion spring encircling a portion of said first stationary shaft for each valve member for biasing said valve member toward its closed position, one leg of which is in contact with said valve member and the other leg of which is in contact with a second shaft parallel to said first stationary shaft.]

* * * * *